Aug. 5, 1952     E. H. FLETCHER     2,606,031
DUAL CHECK VALVE ASSEMBLY FOR HYDRAULIC CONTROL SYSTEMS
Filed April 21, 1950
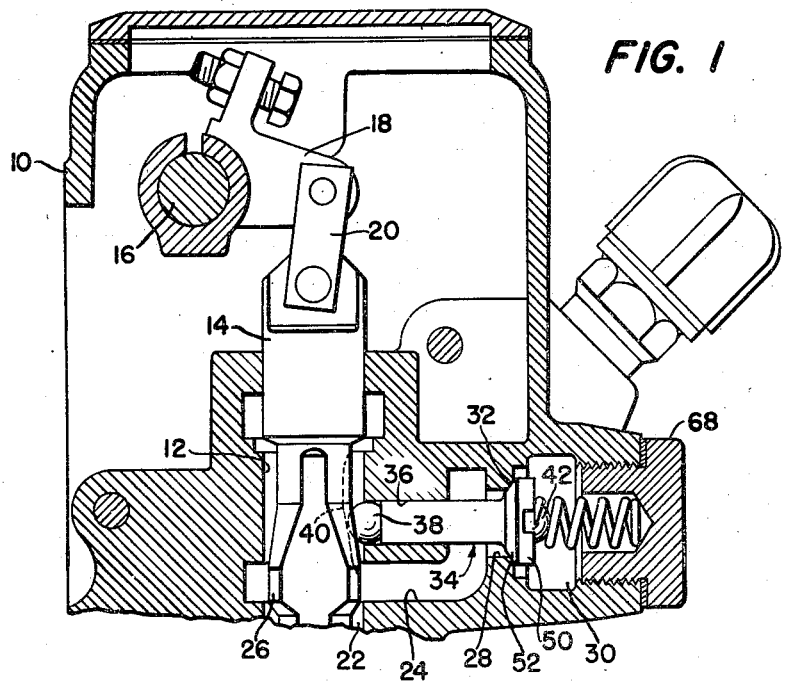
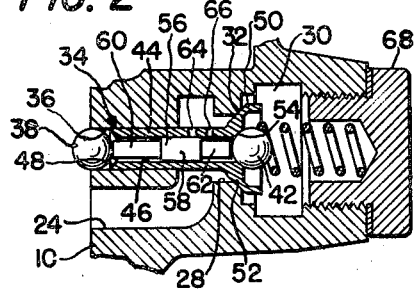
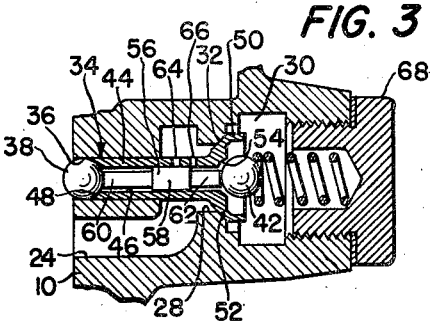
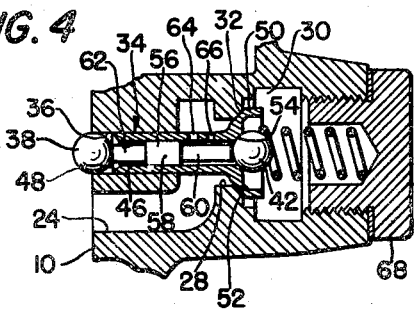
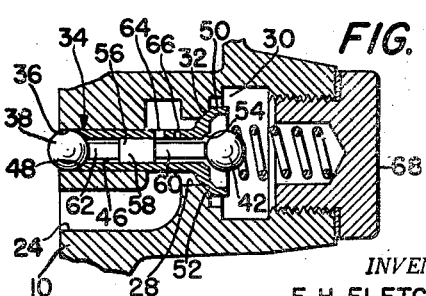
INVENTOR
E. H. FLETCHER
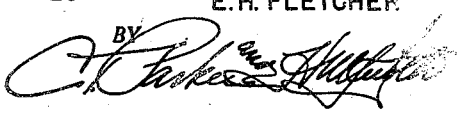
ATTORNEYS Patented Aug. 5, 1952

2,606,031

UNITED STATES PATENT OFFICE 2,606,031

DUAL CHECK VALVE ASSEMBLY FOR HYDRAULIC CONTROL SYSTEMS

Edward H. Fletcher, Cedar Falls, Iowa, assignor to Deere Manufacturing Co., Dubuque, Iowa, a corporation of Iowa Application April 21, 1950, Serial No. 157,350

3 Claims. (Cl. 277—20)

This invention relates to a hydraulic control system and more particularly to a dual check valve assembly for use in such system.

The primary purpose of the invention is to provide improvements in a dual check valve of the general class referred to to the end that desirable refinements in control are available when selectively operating the hydraulic system at either high or low speeds. A typical example of such hydraulic system is that used as the source of power on an agricultural tractor for adjusting implements drawn by or mounted on the tractor. In the instances of a plow, cultivator or planter, there are conditions in which it is desirable merely to raise or lower the implement with respect to the ground. Under such conditions, the hydraulic system may be operated at full speed. Under other conditions, however, it may be desirable to effect a rather fine adjustment, and it is therefore necessary that the operator have the system well under control. Of course, the slow-speed control for fine adjustments could be accomplished by manually moving the control valve to a partially opened position, but it will be seen that such partially opened position is not accurately defined and could easily be disturbed so that the tool would have to be readjusted. According to the present invention, there is provided a dual check valve assembly comprising a pair of relatively movable parts, the smaller of which is initially opened to permit slow-speed operation and the larger of which is subsequently opened simultaneously with further opening of the smaller part to provide for full-speed operation, it being understood that relative movement of the smaller and larger parts provides for throttled fluid flow.

A further improvement provided by the present invention resides in the provision of selectively cooperative passage means in the smaller and larger parts so that different ranges of fluid-restricting characteristics can be obtained without affecting the operational characteristics of the assembly. In brief, the check valve comprises a larger outer part having an axial bore therethrough in which is slidably carried an inner part adapted to be initially engaged by a valve-actuating member. The outer part has fluid passage means and the inner part has fluid passage means at each of its opposite ends. The inner part is reversible or interchangeable end for end and the passage means at one end cooperates with the passage means in the outer part in a manner different from the cooperation between the passage in the outer part and the passage at the other end of the inner part. At the same time, the reversibility of the inner part does not affect the operational characteristics thereof with respect to the valve operating member, so that in either position, the check valve functions identically except for different fluid-restricting characteristics through the selectively differently cooperating fluid passage means.

Another object of the invention is to provide an improved check valve assembly that may be easily and economically constructed and one that may be readily provided for installation in hydraulic control systems of certain known types.

The foregoing and other important objects and desirable features inherent in and encompassed by the invention will become apparent as a complete disclosure of a preferred embodiment of the invention is made in the following detailed description and accompanying sheet of drawings in which Figure 1 is a fragmentary sectional view of a power control casing or housing embodying the improved check valve assembly;

Figure 2 is a fragmentary sectional view showing the check valve assembly in section with the inner part in one of its positions and both parts in closed position;

Figure 3 is a view similar to Figure 2 but showing the inner part moved to its initial opening position; and Figures 4 and 5 are respectively similar to Figures 2 and 3 but the inner valve part is changed end for end.

The hydraulic power control system chosen for the purposes of illustration is merely typical of many other forms that it could assume. Likewise, the dual character of the check valve assembly per se, apart from the selective throttling means, may take any form other than that illustrated, since the basic concept of a dual check valve is old as disclosed in U. S. Patent No. 1,215,146.

That portion of the hydraulic system illustrated in Figure 1 represents a control or valve casing 10 provided with a main control valve bore 12 in which is carried for reciprocation a main control valve 14. A rockshaft 16 is provided with an arm 18 which is connected by an operating link 20 to the upper end of the control valve 14. The bottom portion of the valve bore 12, as at 22, provides part of a high-pressure fluid passage which is normally cut off from an adjoining fluid passage 24 by means of an annular enlarged section 26 of the main valve 14.

The passage 24 communicates through a port 28 separated from an adjoining chamber 30 by a valve seat 32 and a dual check valve assembly designated generally by the numeral 34. The chamber 30 may communicate in any suitable manner with a fluid motor, for example (not shown).

A bore 36 coaxial with the port 28 and valve seat 32 serves to carry the check valve assembly for axial shifting to control the valve seat 32 and port 28. A control ball 38 at the inner end of the check valve assembly cooperates with the check valve assembly and with a ramp 40 on the control valve 14 to effect shifting of the check valve assembly to the right against a spring-loaded second ball 42.

In general, the operation is as follows: It will be assumed that the main control valve 14 is in neutral position as shown. When the rockshaft 16 is moved in a counterclockwise direction to move the valve 14 upwardly, the ramp 40 on the main valve forces the ball 38 against the left-hand end of the check valve 34 and opens the check valve to communicate the chamber 30 and the valve bore 12 via the passage 24 and port 28. It will be seen that opening of the check valve 34 is in direct proportion to the amount of upward movement of the control valve 14. When the control valve 14 is returned to its illustrated position, the check valve is caused to seat by means of the spring-loaded ball 42.

The details of the check valve assembly 34 are clearly shown in Figures 2-5. The check valve assembly includes an outer valve part 44 having inner and outer ends and provided with an axial bore 46, preferably cylindrical, communicating the opposite ends of the valve part. The inner end of the valve part is interiorly chamfered at 48 and lies proximate to the inner valve-actuating member comprising the ball 38. The outer end of the valve part 44 is enlarged to provide a head 50 which is exteriorly formed with a poppet or conical seating surface 52 and which is interiorly formed with a conical valve seat 54. The valve surface 52 cooperates with the valve seat 32 to control the port 28 between the passage 24 and the chamber 30. The interior seat 54 provides a seat for the spring-loaded ball 42. Since the interior seat 54 communicates with the outer end of the bore 46, the ball 42 and the seat 54 cooperate to control communication between the outer end of the bore 46 and the chamber 30. The action of the spring on the ball 42 serves to normally close the opening provided by the seats 32 and 54.

The valve assembly 34 further includes an inner part 56 in the form of an elongated combined metering and control rod having an intermediate cylindrical portion 58 and reduced cylindrical end portions 60 and 62. The cylindrical portion 58 carries the inner part 56 in the outer part for axial shifting in the bore 46; but the bore 46 and portion 58 are comparably cylindrical to the extent that the fit therebetween is sufficiently close to substantially seal the bore against the transmission of fluid between its inner and outer ends. The portions 60 and 62 are of reduced diameter as respects the diameter of the bore 46. It will be noted that the portion 60 is considerably longer than the portion 62.

The reduction in cross-section of the portions 60 and 62 as respects the cross-sectional area of the bore 46 provides, in conjunction with the differences in length of the portions 60 and 62, what may be termed first and second fluid passage means respectively at opposite ends of the inner valve part 56. As will be explained below, these passage means are selectively cooperative with passage means comprising a pair of different sized orifices 64 and 66 formed in the outer part 44 axially inwardly of the outer part head 50 and extending generally radially so as to effect fluid-transmitting communication between the interior of the bore 46 and that portion of the exterior of the outer part 44 that opens to the passage 24. The orifice 66 is somewhat smaller than the orifice 64 and the two are in axially spaced relation.

When the combined control and metering rod 56 is in the position of Figure 2, the inner end portion 60 is proximate to the valve-actuating ball 38 and the outer end portion 62 is engaged by the spring-loaded ball 42, the spring serving to hold the entire assembly in closed position. The length of the portion 62 is such as to expose or uncover the orifice 66, the larger cylindrical portion 58 blocking or covering the other orifice 64. Hence, the fluid-restricting characteristics of the communication between the passage 24 and the interior of the bore 46 at the head end of the outer part 44 is determined solely on the basis of the orifice 66 and the difference in cross-sectional area between the bore 46 and the outside diameter of the reduced portion 62. The left-hand end portion 60 projects axially slightly beyond the left-hand end of the bore 46 and thus engages the valve-actuating ball 38, the ball-receiving chamfer at the left end or inner end of the part 44 being in axially spaced relation to the ball 38, whereby upward shifting of the main control valve 14 effects initial shifting of the control and metering rod 56 prior to shifting of the outer valve part 44. This result is shown in Figure 3. When the main control valve member 14 is moved sufficiently to shift the control and metering rod 56 but not the outer valve part 44, the outer ball 42 is unseated from the seat 54 by means of the outer or right-hand end 62 of the rod. Fluid pressure in the chamber 30 maintains the seated relation between the outer part 44 and the valve seat 32. As shown in Figure 3, the amount of movement of the control and metering rod 56 sufficient to bring about the condition just described gives effect to the co-operative relation between the passage means comprising the orifice 66 and the annular space between the portion 62 and the interior of the right-hand end of the bore 46, fluid now flowing from the chamber 30, past the seat 54 and between the bore 46 and the portion 62, and through the orifice 66 and into the passage 24. The primary function of cracking the check valve to this extent is to regulate the flow of fluid through the check valve by means of the inner valve part comprising the control and metering rod 56. Hence, in those cases in which it becomes necessary to open the check valve assembly 34 against the pressure of fluid in the chamber 30, the opening is made easier by first unseating the ball 42 and then unseating the outer part. This result will follow from initial engagement by the ball 38 with the control and metering rod and subsequent engagement with the inner end of the outer part 44. In a two-way system, which will be equipped with two check valve assemblies similar to the assembly 34, the transmission of fluid at high pressure but at a reduced rate will be obtainable by throttling the return fluid through the restriction provided by the co-operating passage means just described.

It will be noted that maximum opening of the ball 42 as effected by the combined control and metering rod is effected by that amount of movement of the control and metering rod necessary merely to unseat the ball without closing the orifice 66, at the same time maintaining the closure on the unused orifice 64. At the end of movement of the control and metering rod, the ball 38 picks up the outer part and both the inner and outer parts move simultaneously, the relative positions between the inner and outer parts not changing during subsequent movement.

It is often desired to utilize a particular hydraulic control system in situations in which the fluid-flow characteristics are somewhat different. Hence, it is feasible to provide means for adapting the system to the changed condition. It is, of course, expedient that such means be simple and inexpensive and that it have capacity for use without materially altering the main components of the system. Such an arrangement is provided according to the present invention, since all that is necessary is reversing of the control and metering rod end for end so as to obtain cooperative fluid passage means providing different fluid-flow characteristics. This result is shown in Figures 4 and 5.

In the particular embodiment illustrated, the outer end of the chamber 30 is closed by a threaded plug 68 which serves also as a seat for the end of the spring for the ball 42. After the plug 68 is removed, the spring and ball 42 may be removed, followed by removal of the check valve assembly 34. The control and metering rod may be changed end for end and the components reassembled, resulting in disposition of the control and metering rod 56 as shown in Figure 4 with the short end 62 proximate to the ball 38 and the long end 60 proximate to the ball 42. Because of the increased length of the portion 60 over that of the portion 62, both orifices 64 and 66 are uncovered. It follows that the extent of axial projection of the left-hand or inner end of the control and metering rod in the reversed position of the rod will be the same as before; therefore, the operational characteristics of the rod as a control member will not be changed, even though the function thereof in modifying the fluid-flow characteristic will give a result different from that obtained in the position of Figure 2.

When the control and metering rod 56 is shifted to the right by the ball 38 to the position of Figure 5, the shoulder formed at the junction between the intermediate portion 58 and the reduced portion 60 falls just short of the orifice 64 so that both orifices remain open. Other than the variation in the fluid-flow characteristics, the operational and functional characteristics of the control and metering rod are the same in both positions.

The instant disclosure is based upon a preferred embodiment of the invention. However, it will be appreciated that numerous modifications and alterations may be made in the invention without departing from the spirit and scope thereof as defined in the appended claims.

What is claimed is:

1. For use in a valve casing having a valve port including an outer portion provided with a valve seat and an inner portion opening to a valve-actuating member: a dual valve, comprising, an outer part formed externally to be shiftably carried in the valve port and having opposite inner and outer ends and provided with a through bore communicating said ends; means at the outer end of said part including a valve head cooperative to seat on and be unseated from the port seat, and means at the inner end of said part engageable by the valve-actuating member to effect shifting of said part for causing unseating of said valve head; an inner valve part having opposite ends and constructed for reversibility end for end to occupy selectively either of two adjusted operating positions relative to the outer part and so dimensioned intermediate its said ends as to axially slidably fit the bore in substantially fluid-sealing relationship in either of said positions; said inner part in either position having one of its ends encircled by the valve head and the other of its ends projecting axially beyond the inner end of the bore so as to be initially engageable by the valve-actuating member for axial shifting prior to engagement by said member of the inner end of the outer part, said inner part in either position having its valve-actuating-member-proximate end identically arranged relative to said valve-actuating member; means providing a plurality of generally radial orifices communicating through the outer part to the bore therein axially inwardly of the valve head; first and second fluid control portions on the inner part respectively at and opening generally axially to the opposite ends of said inner part and selectively communicable with said orifice means in the outer part in the respective adjusted positions of said inner part; and said first and second fluid control portion being differently formed and dimensioned so that said first portion, in one adjusted position of the inner part, communicates with a certain number of said orifices and said second portion, in the other adjusted position of said inner part, communicates with a different number of said orifices.

2. For use in a valve casing having a valve port including an outer portion provided with a valve seat and an inner portion opening to a valve-actuating member: a dual valve, comprising, an outer part formed externally to be shiftably carried in the valve port and having opposite inner and outer ends and provided with a through bore communicating said ends; means at the outer end of said part including a valve head cooperative to seat on and be unseated from the port seat, and means at the inner end of said part engageable by the valve-actuating member to effect shifting of said part for causing unseating of said valve head; an inner valve part having opposite ends and constructed for reversibility end for end to occupy selectively either of two adjusted operating positions relative to the outer part and so dimensioned intermediate its said ends as to axially slidably fit the bore in substantially fluid-sealing relationship in either of said positions; said inner part in either position having one of its ends encircled by the valve head and the other of its ends projecting axially beyond the inner end of the bore so as to be initially engageable by the valve-actuating member for axial shifting prior to engagement by said member of the inner end of the outer part, said inner part in either position having its valve - actuating - member-proximate end identically arranged relative to said valve-actuating member; means providing a plurality of generally radial orifices spaced apart axially and communicating through the outer part to the bore therein axially inwardly of the valve head; means on the inner part providing first and second fluid-control portions respectively at and opening generally axially to the opposite ends of the inner part and selectively communicable with said orifice means in the outer part in the respective adjusted positions of said inner part; said first fluid-control portion being of reduced cross-section and of selected axial length at one end of the inner part and operative in one adjusted position of said inner part to uncover a certain number of orifices while blocking another certain number thereof; and said second fluid control portion being of reduced cross-section and of selected axial length greater than the length of the first portion and operative, in the outer adjusted position of said inner part to uncover a greater number of said orifices.

3. For use in a valve casing having a valve port including an outer portion provided with a valve seat and an inner portion opening to a valve-actuating member: a dual valve, comprising, an outer part formed externally to be shiftably carried in the valve port and having opposite inner and outer ends and provided with a through bore communicating said ends; means at the outer end of said part including a valve head cooperative to seat on and be unseated from the port seat; and means at the inner end of said part engageable by the valve-actuating member to effect shifting of said part for causing unseating of said valve head; an inner valve part having opposite ends and constructed for reversibility end for end to occupy selectively either of two adjusted operating positions relative to the outer part and so dimensioned intermediate its said ends as to axially slidably fit the bore in substantially fluid-sealing relationship in either of said positions; said inner part in either position having one of its ends encircled by the valve head and the other of its ends projecting axially beyond the inner end of the bore so as to be initially engageable by the valve-actuating member for axial shifting prior to engagement by said member of the inner end of the outer part, said inner part in either position having its valve-actuating-member-proximate end identically arranged relative to said valve-actuating member; means providing a pair of generally radial orifices of different sizes spaced apart axially and communicating through the outer part to the bore therein axially inwardly of the valve head; means in the inner part providing first and second axially separated first and second fluid passage means respectively at and opening generally axially to the opposite ends of the inner part and selectively communicable with said orifice means in the outer part in the respective adjusted positions of said inner part; said first passage means including a portion of reduced cross-section and of selected axial length at one end of the inner part and operative in one adjusted position of said inner part to uncover the smaller of said orifices while blocking the larger; and said second fluid passage means including a portion of reduced cross-section and of selected axial length greater than the length of the first means portion and operative, in the other adjusted position of said inner part to uncover both of said orifices.

EDWARD H. FLETCHER.

REFERENCES CITED

The following references are of record in the file of this patent:

UNITED STATES PATENTS

| Number | Name | Date |
| --- | --- | --- |
| 1,215,146 | Haeseler | Feb. 6, 1917 |
| 2,355,692 | Allen | Aug. 15, 1944 |
| 2,483,312 | Clay | Sept. 27, 1949 |